US009996520B2

(12) United States Patent
Steele (10) Patent No.: US 9,996,520 B2
(45) Date of Patent: *Jun. 12, 2018

(54) SELECTIVELY PINNING SECTIONS OF DISPLAYED CONTENT (71) Applicant: INTERNATIONAL BUSINESS MACHINES CORPORATION, Armonk, NY (US)

(72) Inventor: Gabrielle Z. Steele, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/828,545

(22) Filed: Aug. 18, 2015

(65) Prior Publication Data

US 2016/0231893 A1 Aug. 11, 2016

Related U.S. Application Data (63) Continuation of application No. 14/619,746, filed on Feb. 11, 2015.

(51) Int. Cl.
G06F 3/0485 (2013.01)
G06F 17/24 (2006.01)

(52) U.S. Cl.
CPC .......... *G06F 17/246* (2013.01); *G06F 3/0485* (2013.01); *G06F 3/04855* (2013.01)

(58) Field of Classification Search
CPC .... G06F 3/0484; G06F 3/0485; G06F 17/241; G06F 3/04855; G06F 17/246
See application file for complete search history.

(56) References Cited

U.S. PATENT DOCUMENTS

| 5,410,648 | A | * | 4/1995 | Pazel | G06F 8/10 700/87 |
| 6,493,868 | B1 | * | 12/2002 | DaSilva | G06F 8/20 345/1.3 |
| 8,947,452 | B1 | * | 2/2015 | Ballagh | G06F 3/0486 345/420 |
| 9,430,141 | B1 | * | 8/2016 | Lu | G06F 17/241 |

(Continued)

FOREIGN PATENT DOCUMENTS

WO 2014110048 A1 7/2014

OTHER PUBLICATIONS

Anonymous, "Manage Multiple Windows", Microsoft Corporation, windows.microsoft.com, retrieved Dec. 15, 2014, pp. 1-3.

(Continued)

*Primary Examiner* — William L Bashore
*Assistant Examiner* — Daniel W Parcher
(74) *Attorney, Agent, or Firm* — Law Office of Jim Boice (57) ABSTRACT A method, system, and/or computer program product pins an area on a user interface. One or more processors receive a pinning signal from a user. The pinning signal defines a pinned area on a user interface. The pinned area is an unrestricted freeform area that is defined by the user. One or more processors then receive a scrolling input, which causes an unpinned area on the user interface to move on the user interface, while the pinned area is displayed z-indexed above the unpinned area that has moved, and while the pinned area remains in a fixed position on the user interface.

12 Claims, 8 Drawing Sheets (56) References Cited

U.S. PATENT DOCUMENTS

| | | | |
|---|---|---|---|
| 2003/0142139 A1* | 7/2003 | Brown | G06F 3/0481 |
| | | | 715/800 |
| 2005/0091578 A1* | 4/2005 | Madan | G06F 17/241 |
| | | | 715/201 |
| 2008/0040683 A1 | 2/2008 | Walsh | |
| 2013/0007656 A1* | 1/2013 | Li | G06F 3/04842 |
| | | | 715/790 |
| 2013/0086464 A1* | 4/2013 | Thangappan | G06F 17/30994 |
| | | | 715/227 |
| 2013/0311930 A1 | 11/2013 | Suave et al. | |
| 2014/0137037 A1 | 5/2014 | Jin et al. | |
| 2014/0258916 A1* | 9/2014 | Laycock | G05B 19/042 |
| | | | 715/781 |

OTHER PUBLICATIONS

Anonymous, "How to Keep a UI Element in View When Scrolling a Page in Windows Phone", Microsoft Corporation, developer.nokia.com, retrieved Dec. 15, 2014, pp. 1-8.

Anonymous, "Freeze or Lock Rows and Columns", Microsoft Corporation, office.microsoft.com, retrieved Dec. 15, 2014, pp. 1-2.

Anonymous, "Tile Tabs 11.13", Mozilla, mozilla.org, retrieved Dec. 15, 2014, pp. 1-9.

List of IBM Patents or Patent Applications Treated As Related—Aug. 12, 2015, pp. 1-2.

\* cited by examiner

SELECTIVELY PINNING SECTIONS OF DISPLAYED CONTENT

BACKGROUND

The present disclosure relates to the field of computers, and specifically to displays on computers. Still more specifically, the present disclosure relates to user interfaces on displays.

SUMMARY

In one or more embodiments of the present invention, a method, system, and/or computer program product pins an area on a user interface. One or more processors receive a pinning signal from a user. The pinning signal defines a pinned area on a user interface. The pinned area is an unrestricted freeform area that is defined by the user. One or more processors then receive a scrolling input, which causes an unpinned area on the user interface to move on the user interface, while the pinned area is displayed z-indexed above the unpinned area that has moved, and while the pinned area remains in a fixed position on the user interface.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
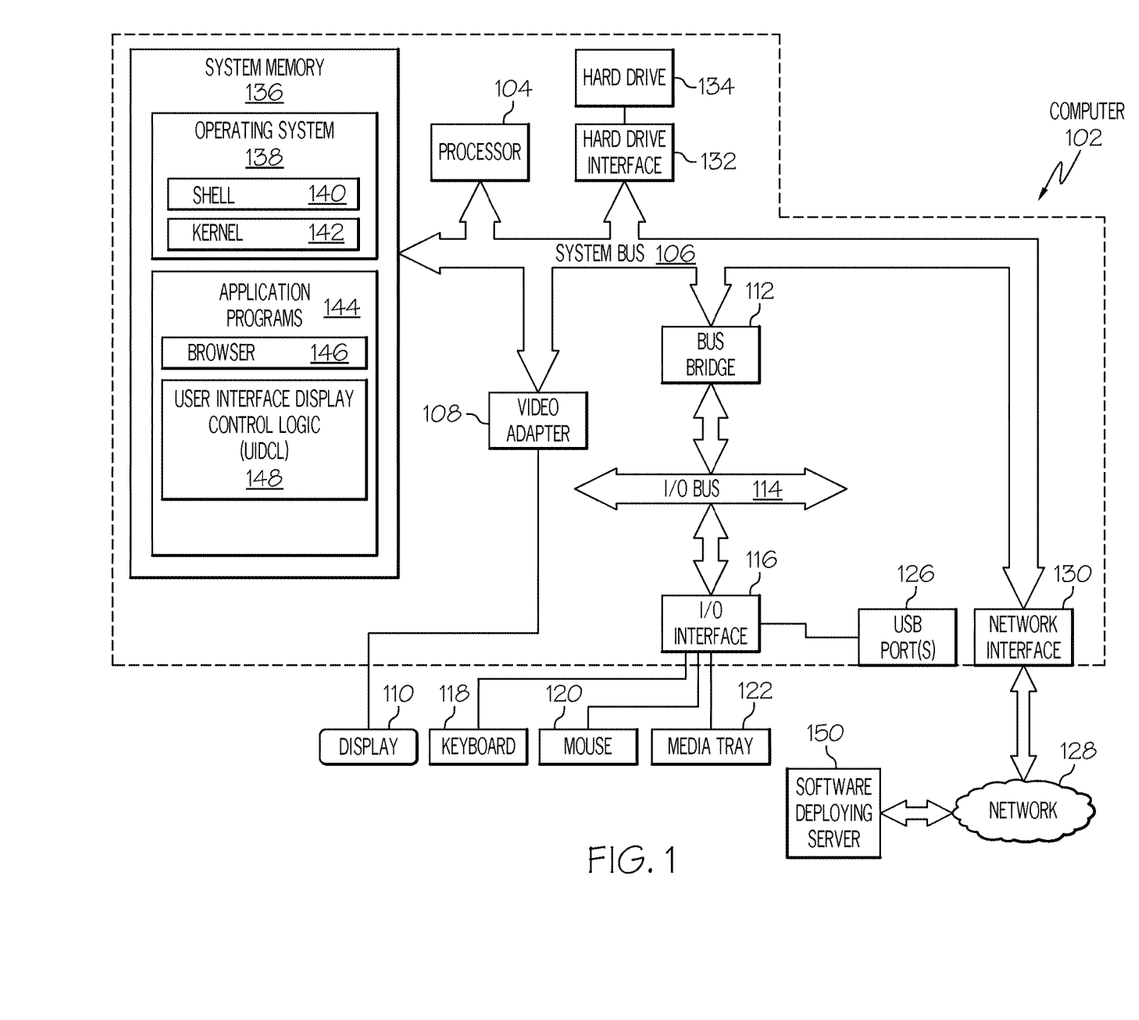
FIG. 1 depicts an exemplary system and network which may be used to implement the present invention.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150.

Application programs 144 in computer 102's system memory (as well as software deploying server 150's system memory) also include a user interface display control logic (UIDCL) 148. UIDCL 148 includes code for implementing the processes described below, including those described in FIGS. 2-8. In one embodiment, computer 102 is able to download UIDCL 148 from software deploying server 150, including in an on-demand basis, wherein the code in UIDCL 148 is not downloaded until needed for execution. Note further that, in one embodiment of the present invention, software deploying server 150 performs all of the functions associated with the present invention (including execution of UIDCL 148), thus freeing computer 102 from having to use its own internal computing resources to execute UIDCL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
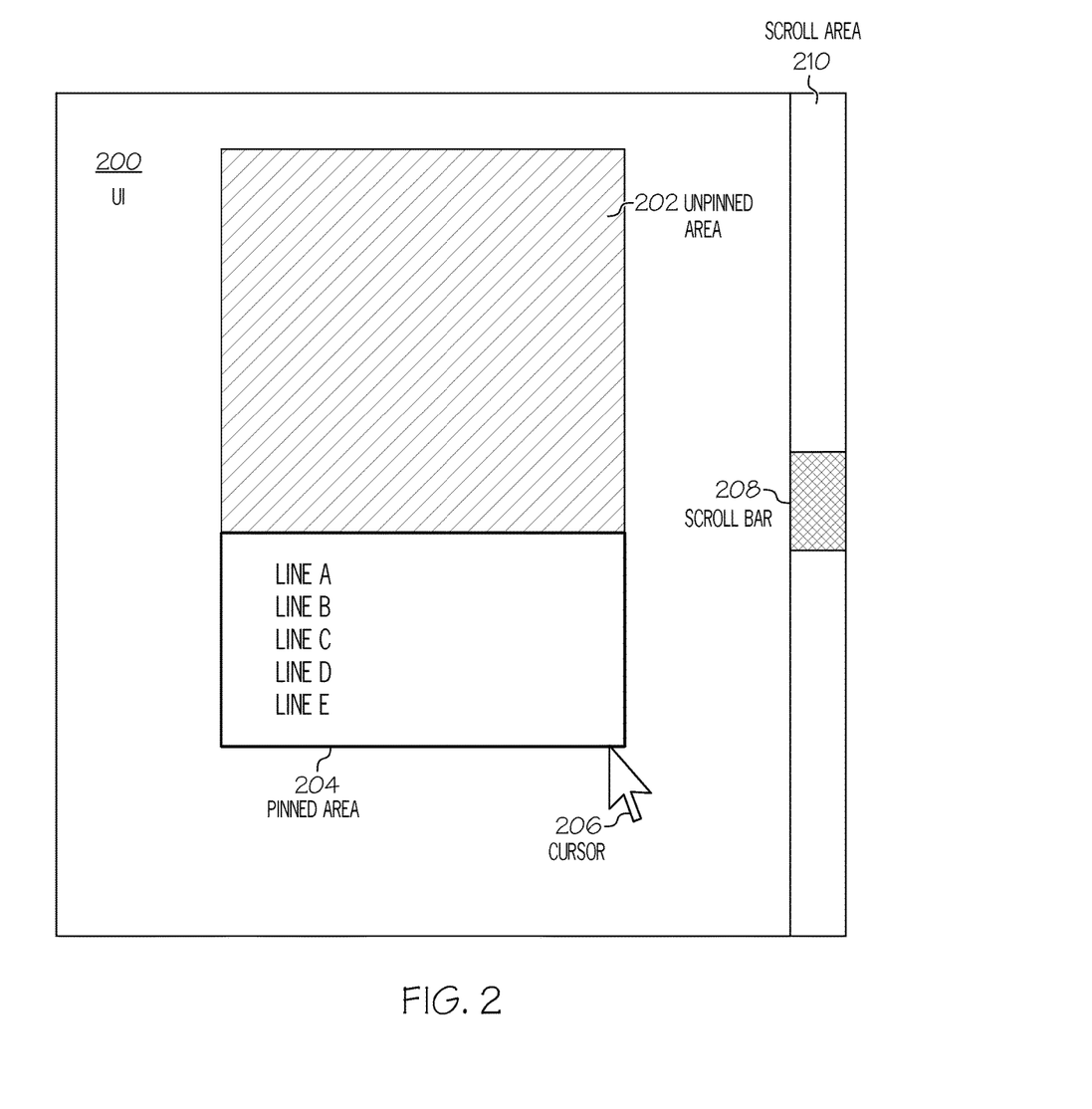
FIG. 2 illustrates an initial state of a user interface, in which a pinned area is defined by a user.

With reference now to FIG. 2, an initial state of a user interface 200 in accordance with one or more embodiments of the present invention is presented. As depicted, user interface 200, which may display a webpage, an application, or any other type of graphical/text material, has an initial unpinned area 202. Unpinned area 202 initially includes a pinned area 204. However, when a user defines and selects pinned area 204 by positioning and clicking a cursor 206 (or providing some similar type of input), then pinned area 204 takes on unique properties. More specifically, pinned area 204 and unpinned area 202 respond differently to scrolling operations (e.g., when a user turns/scrolls a wheel on a mouse, or drags a scrollbar 208 along a scroll area 210). Similarly, the pinned area 204 and unpinned area 202 respond differently to scrolling operations from a keyboard, using up/down keys on the keyboard.

In one embodiment of the present invention, a system (e.g., processor 104 executing UIDCL 148 in FIG. 1) identifies the pinned area 204 using coordinate information provided by the cursor position while the user defines the pinned area 204. Content within the identified pinned area 204 is then captured by the system, in order to maintain a copy of the content to present in a fixed (and always visible) location on the user interface.

Figure 3:
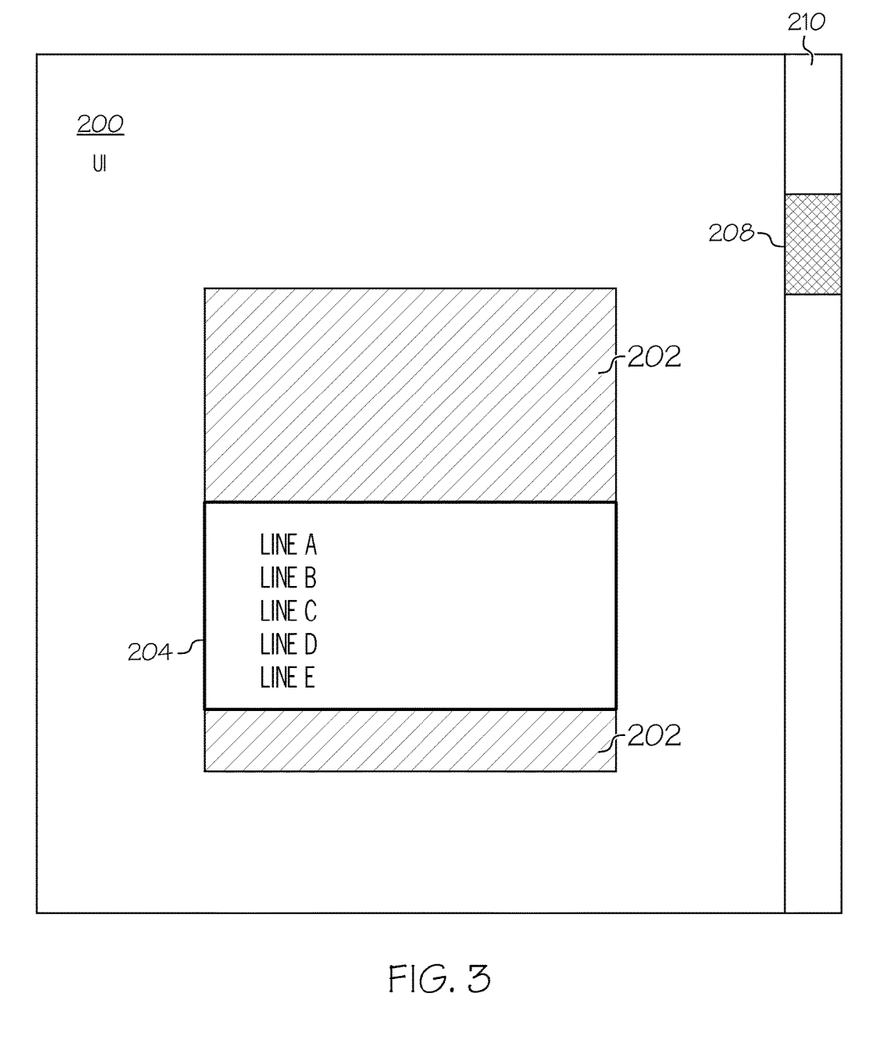
FIG. 3 depicts the user interface in FIG. 2 after an unpinned area has been scrolled, while the pinned area remains stationary.
Figure 4:
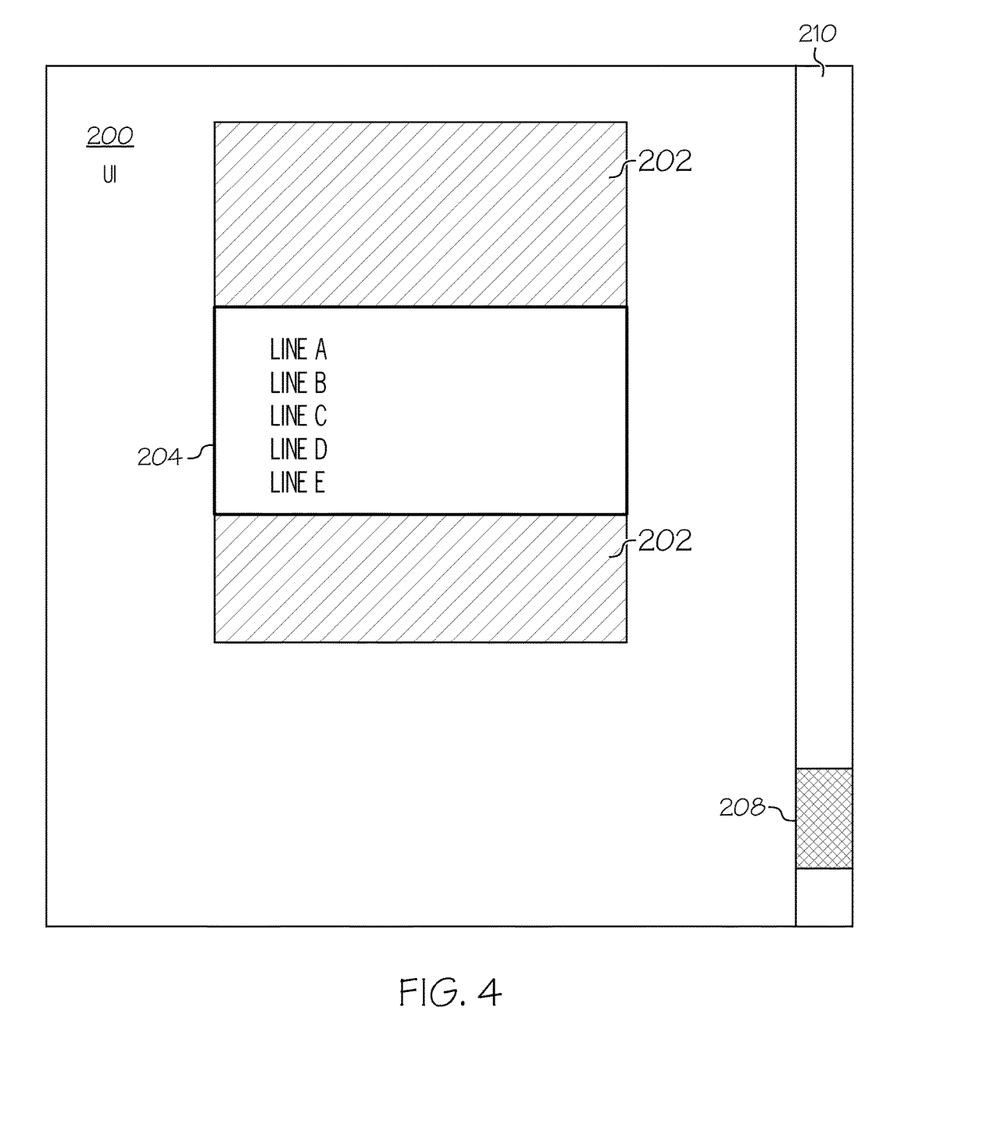
FIG. 4 illustrates the user interface in FIG. 2 after the pinned area has been scrolled, while the unpinned area remains stationary.

Consider now FIG. 3, in which the scrollbar 208 has been dragged upwards, as depicted. In this depicted embodiment of the present invention, the unpinned area 202 moves downward (in response to the scrollbar 208 moving upward). However, despite the movement of the scrollbar 208, the pinned area 204 remains in the same place on the user interface 200. Furthermore, the pinned area 204 is z-indexed above the unpinned area 202 (i.e., the pinned area 204 remains "on top of" the unpinned area 202), such that the content of the pinned area 204 is never obscured. Also, the pinned area 204 remains "active", such that content within the pinned area 204 can be modified by the user, hyperlinks to webpages remain active, etc. That is, "focus" remains on the pinned area 204.

In another embodiment, the pinned area moves in response to scrollbar movement while the unpinned area remains fixed. For example, consider FIG. 4, in which the scrollbar 208 has been moved downward by the user. This resulted in the unpinned area 202 remaining in its original position on the user interface 200, but the pinned area 204 now moves upward, as depicted. Nonetheless, as in FIG. 3, the pinned area 204 is z-indexed above the unpinned area 202, and "focus" remains on the pinned area 204.

Note further that all of the information ("Line A-Line E") in the pinned area remains visible, whether the pinned area 204 is fixed in place (FIG. 3) or moves (FIG. 4) in response to scrollbar movement.

In FIG. 2, the size, shape, and location of the pinned area 204 is freeform and unrestricted. That is, the user does not need to select a pane, panel, cell, etc. to be pinned (e.g., "frozen") into place, but rather has the freedom of using the cursor 206 or some other pointing input device to define what area/content is to be pinned (and thus have the properties of a pinned area described in FIG. 3 and FIG. 4).

Figure 5:
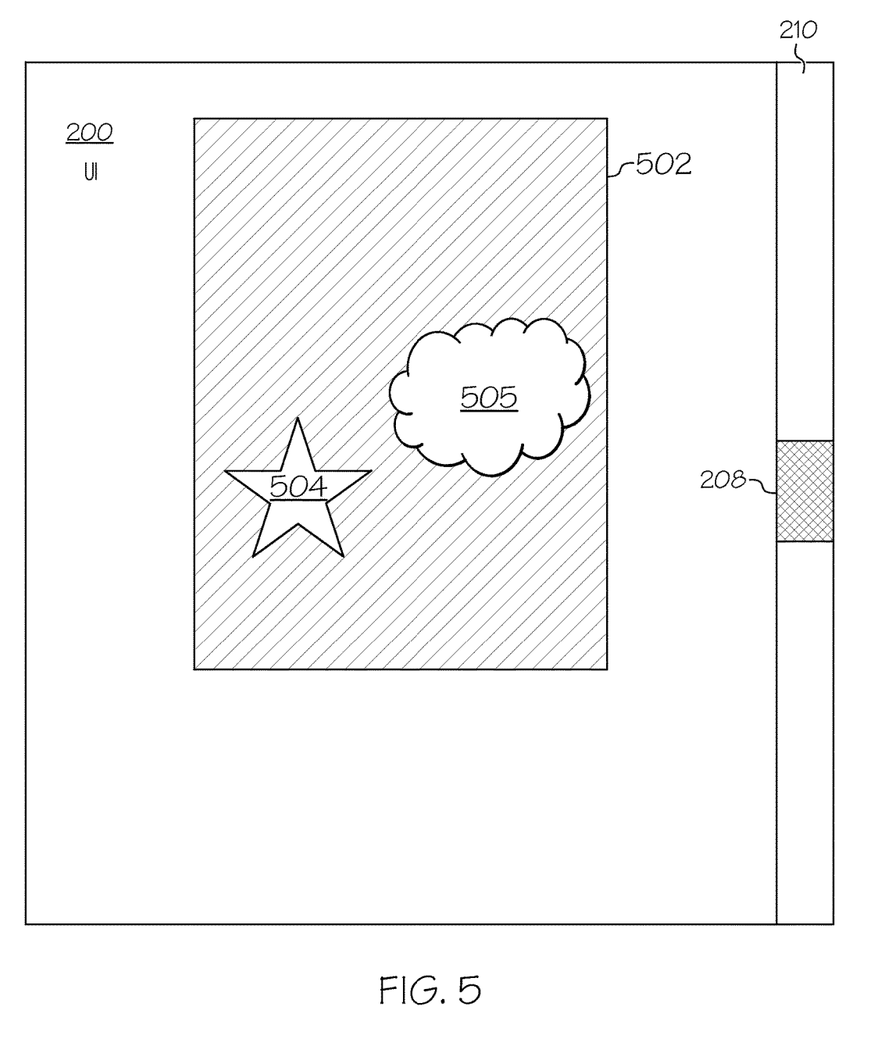
FIG. 5 depicts a user interface having multiple visually coded pinned areas.

In one embodiment of the present invention, the pinned area is visually coded, as shown in FIG. 5. Assume that the user interface 200 is displaying an initial unpinned area 502, which includes areas that will be "pinned" in response to an input from a user (as described above). In this embodiment, however, assume that the user has selected the shape of a star (either from a menu of available shapes or else drawn freehand by the user) to identify which part of the original unpinned area 502 is to be pinned as pinned area 504 (having the same properties of pinned area 204 in FIG. 3 or FIG. 4). The user can also select the shape of a cloud to define pinned area 505. The star shapes and cloud shapes can visually identify various properties of the pinned areas.

For example, the star shape may indicate that the pinned area 504 contains information about astronomy, while the cloud shape may indicate that pinned area 505 contains information about meteorology. Thus, the visual coding (either as a particular shape such as a star, cloud, etc., or as a particular color, texture, etc.) may indicate the content of the pinned area.

Alternatively, the star shape may indicate that the pinned area 504 was defined/selected first, while the cloud shape may indicate that pinned area 505 was selected second (later). Thus, the visual coding (shape, color, shading, etc.) may indicate the order in which the user selected different pinned areas.

Figure 6:
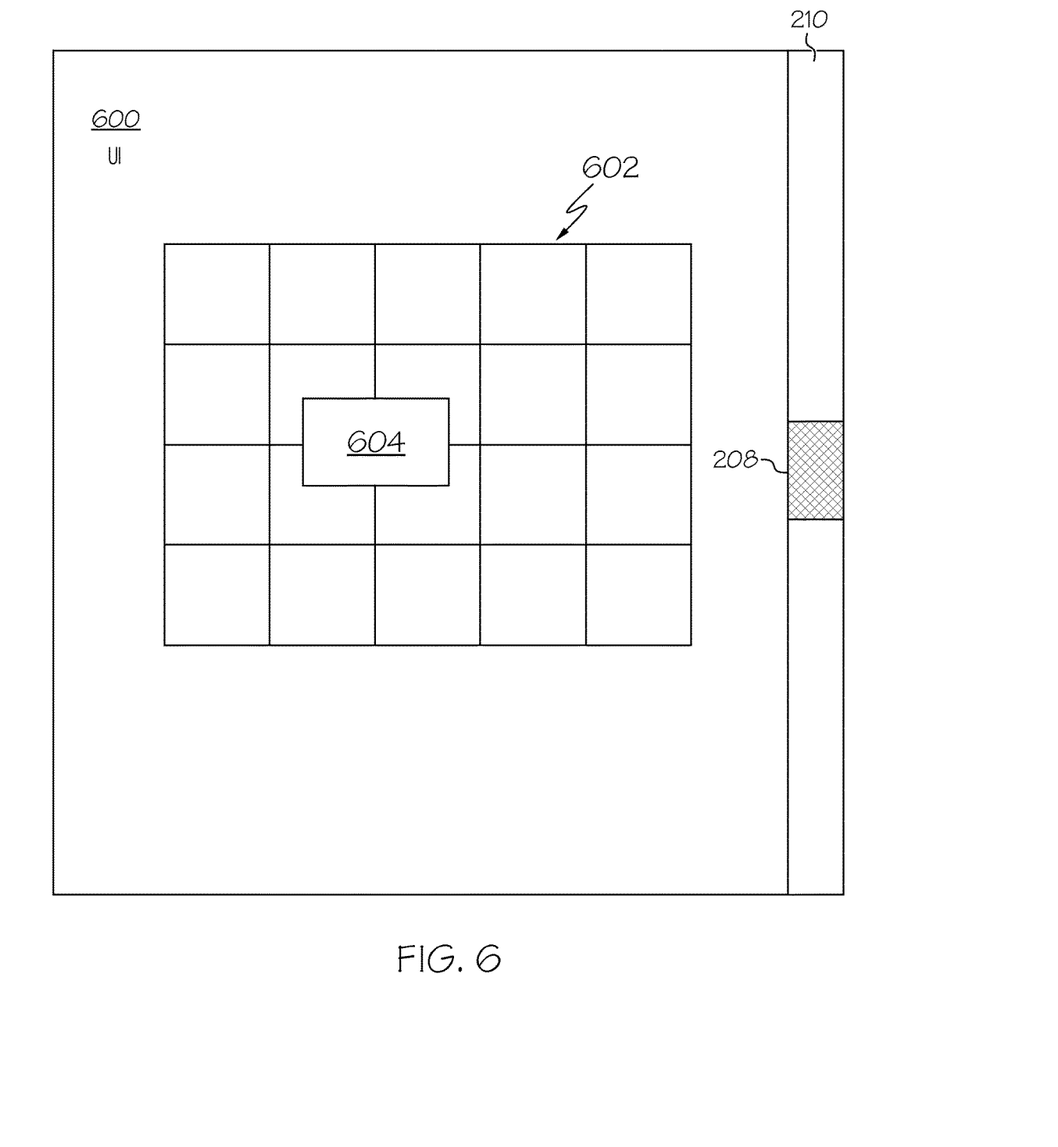
FIG. 6 illustrates a user interface that displays a spreadsheet that is subject to area pinning.

While the user interface 200 shown in FIG. 2-FIG. 5 has been illustrated as displaying generic text/graphic information, FIG. 6 illustrates a user interface 600 that displays a spreadsheet 602. The initial spreadsheet 602 includes initially unpinned areas. However, by the user defining a pinned area 604 using the freeform process described above, a pinned area 604 (having the same properties as pinned area 204 above) is created. Note that pinned area 604 is not restricted to any particular cell or group of cells. In fact, as shown in the example of FIG. 6, the pinned area 604 may traverse across rows and/or columns, but only portions thereof. For example, a particular cell may have a string of data, but only part of that data is pinned by the pinned area 604. This allows greater flexibility in determining what to "freeze" in a spreadsheet. That is, there is no requirement to freeze an entire cell using the present invention.

Figure 7:
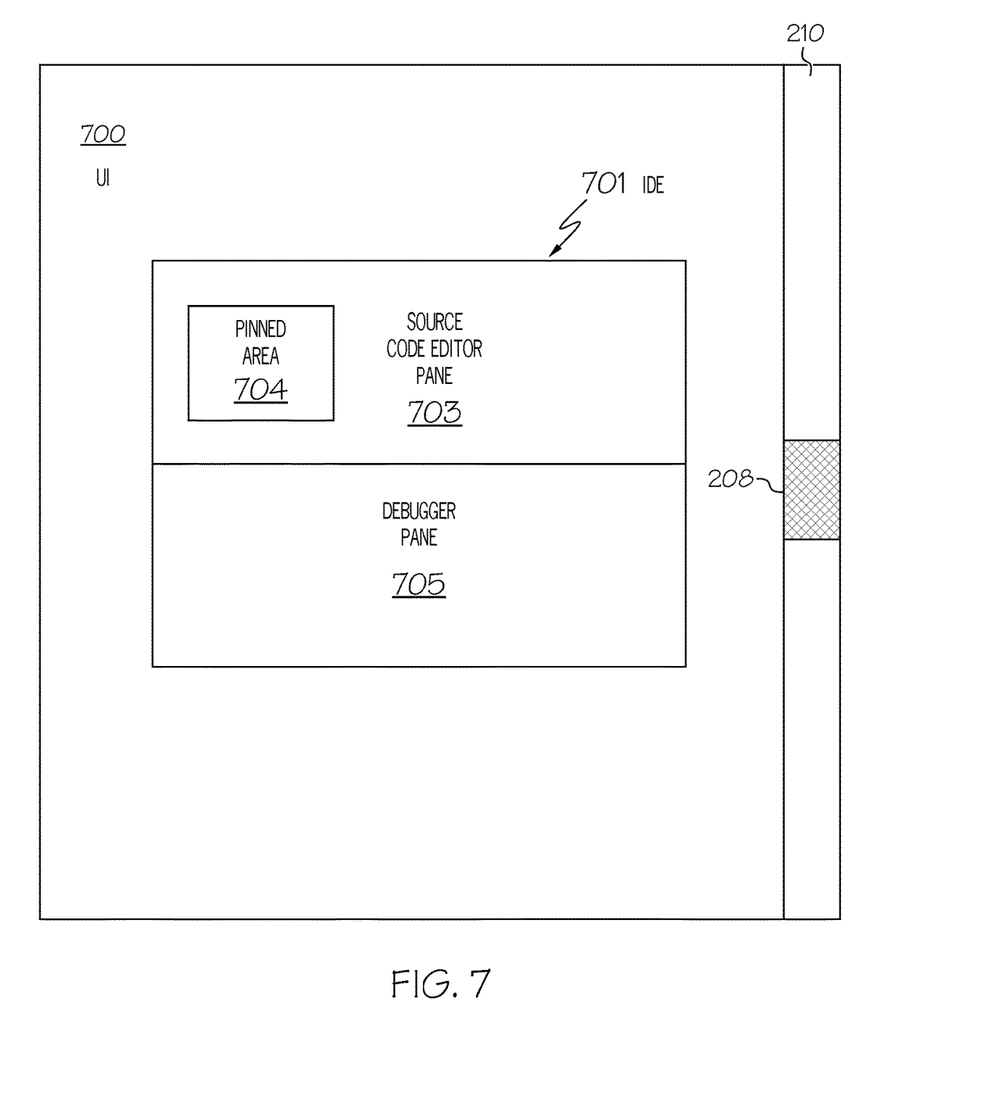
FIG. 7 depicts a user interface that displays an integrated development environment (IDE) that is subject to area pinning.

Another embodiment in which the present invention is useful and may be implemented is in an integrated development environment (IDE). For example, FIG. 7 depicts a user interface 700 that displays an IDE 701, which has a source code editor pane 703 in which a user can type code, and debugger pane 705 that shows errors that occur when the code executes. In one embodiment, a user has defined a pinned area 704 within the source code editor pane 703. When the scrollbar 208 is moved, code within the pinned area 704 remains at a fixed location defined by pinned area 704, while other code within the source code editor pane 703 and/or error messages within the debugger pane 705 scroll in response to the movement of the scrollbar 208. This allows the user to keep certain code in view within the pinned area 704, while still being able to scroll through other code (from the source code editor pane 703) and/or error messages (from the debugger pane 705).

Figure 8:
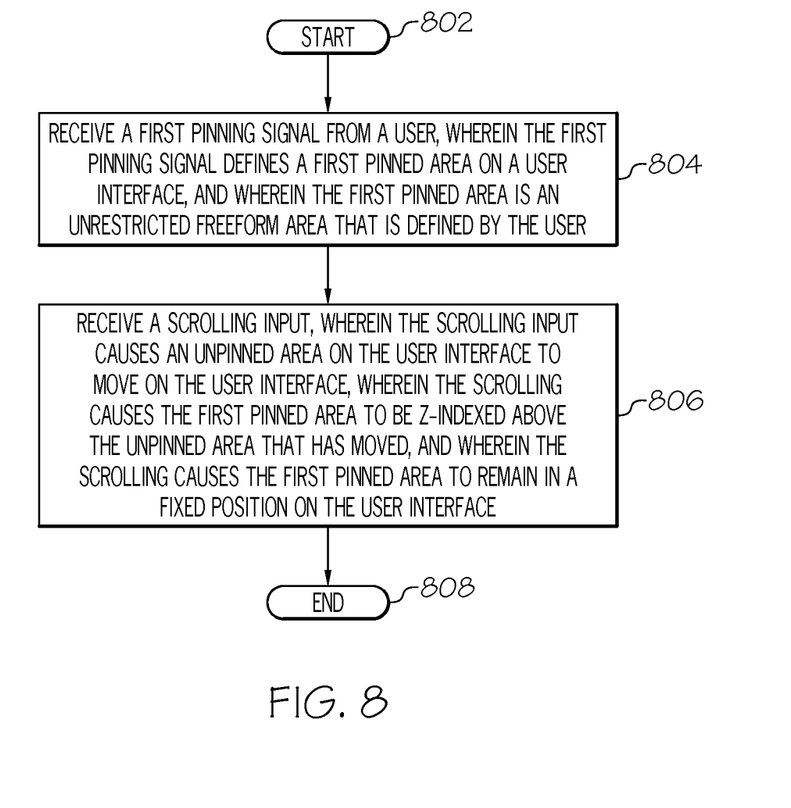
FIG. 8 is a high level flow chart of one or more exemplary steps taken by one or more processors to pin and manage pinned areas on a user interface.

With reference now to FIG. 8, a high level flow chart of one or more exemplary steps performed by one or more processors to pin and manage pinned areas on a user interface is presented. After initiator block 802, one or more processors receive a first pinning signal from a user (block 804). This first pinning signal defines a first pinned area (e.g., pinned area 204 in FIG. 2) on a user interface. The first pinned area is an unrestricted freeform area that is defined by the user. That is, the user can select any region on the user interface as the pinned area, without regard to cell boundaries in a spreadsheet, different formats (e.g., text versus graphics) used in the pinned area, etc.

As described in block 806, one or more processors then receive a scrolling input. As described herein, this scrolling input causes an unpinned area on the user interface to move (i.e., change locations and/or cause content to shift) on the user interface. Furthermore, the scrolling causes the first pinned area to be z-indexed above the unpinned area that has moved, if not already so. This ensures that the pinned area remains visible on the user interface. Furthermore, and as described herein, the scrolling causes (allows) the first pinned area to remain in a fixed (original) position on the user interface.

The flow-chart ends at terminator block 808.

As described herein and in one or more embodiments of the present invention, the first pinned area remains active while the unpinned area is being moved by the scrolling input. That is, content within the pinned area can be modified, hyperlinks remain enabled, etc.

As described herein and in one or more embodiments of the present invention, one or more processors receive a second pinning signal. This second pinning signal is received after the first pinning signal, and defines a second pinned area on the user interface, as described above and depicted in FIG. 5. As with the first pinned area, the second pinned area is an unrestricted freeform area that is created by the user. One or more processors visually encode the second pinned area (e.g., with a preselected shape, color, etc.) to identify the second pinned area as having been pinned after the first pinned area.

As described herein and in one or more embodiments of the present invention, the pinned area is visually coded by a graphically coded user input to identify a particular type of content in the pinned area, as described above and depicted in FIG. 5.

As described herein and in one or more embodiments of the present invention, the user interface presents a spreadsheet (see FIG. 6). The pinned area is not restricted to the boundaries of a cell or group of cells, but rather may extend across only partial portions of at least two columns/rows in the spreadsheet.

As described herein and in one or more embodiments of the present invention, the user interface presents an integrated development environment (IDE), wherein the IDE comprises a source code editor pane and a debugging pane (see FIG. 7). The pinned area captures a portion of the source code editor pane, such that other code within the source code editor pane and/or error messages in the debugging pane can be scrolled while code within the pinned area remains fixed in place on the user interface.

While using applications, the user may wish to retain part(s) of the page on screen and scroll to see other parts. For example, viewing an embedded video with the sound off and scrolling part of the page to read a provided transcript that is unable to entirely fit with the initial viewable display space. The present invention as described herein provides this ability to the user.

The present invention provide new and useful advantages over the prior art.

For example, in the prior art a user could apply focus to one window on a browser while not giving focus to another window. This results in the "unfocused" window being frozen in place. However, this results in the unfocused window often being covered by the window in focus, which the present invention avoids. Furthermore, the present invention negates the need to use multiple windows to view different content, by providing as system in which the user can view multiple parts of the same window that would otherwise not be displayed together.

Spreadsheet software allows users to "freeze" certain rows/columns, such that other rows/columns can be scrolled while the frozen row/column remains fixed in place. However, such systems do not allow portions of cells within a row/column to be frozen, nor do they allow non-contiguous cells to be frozen. The present invention, however, does provide these capabilities by allowing multiple areas to be pinned simultaneously.

Thus, the present invention, as described herein, provides a user with the ability to select a custom area on a display so that it stays in place and is still "live" while the user navigates in such a way that the pinned area does not move and is not hidden from view. The present invention provides a user with a mechanism that allows the user to select an area of displayed content to be pinned in place, thus allowing the user to continue to navigate around the page while keeping the chosen area in place.

As described herein, the area selected to be pinned can be free-form (as opposed to rectangular or some other restricted size/shape), and the selection can be made up of non-contiguous areas (using multiple pinning signals).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A method of pinning an area on a user interface, wherein the method comprises:
   receiving, by one or more processors, a first pinning signal from a user, wherein the first pinning signal defines a first pinned area on a user interface, and wherein the first pinned area is an unrestricted freeform area that is defined by the user;
   receiving, by one or more processors, a second pinning signal from the user, wherein the second pinning signal defines a second pinned area on the user interface, wherein the second pinned area is an unrestricted freeform area that is defined by the user, and wherein the first pinned area and the second pinned area are visually coded by a graphically coded user input that defines a particular shape that indicates an order in which the user defined the first pinned area and the second pinned area; and
   receiving, by one or more processors, a scrolling input, wherein the scrolling input causes an unpinned area on the user interface to move on the user interface, wherein the scrolling causes the first pinned area and the second pinned area to be z-indexed above the unpinned area that has moved, and wherein the scrolling causes the first pinned area and the second pinned area to remain in a fixed position on the user interface.

2. The method of claim 1, wherein the first pinned area remains active while the unpinned area is being moved by the scrolling input.

3. The method of claim 1, wherein the first pinned area and the second pinned area do not overlap.

4. The method of claim 1, wherein the first pinned area is visually coded by a graphically coded user input to identify a particular type of subject matter described by content in the first pinned area, and wherein the graphically coded user input defines a particular shape that suggests the subject matter described by the content in the first pinned area.

5. The method of claim 1, wherein the user interface presents a spreadsheet, wherein the first pinned area extends across only partial portions of different cells from at least two columns in the spreadsheet, wherein the different cells contain different strings of data, and wherein only a portion of the different strings of data are pinned by the first pinned area that extended across only partial portions of the different cells.

6. The method of claim 1, wherein the user interface presents a spreadsheet, wherein the first pinned area extends across only partial portions of different cells from at least two rows in the spreadsheet, wherein the different cells contain different strings of data, and wherein only a portion of the different strings of data are pinned by the first pinned area that extended across only partial portions of the different cells.

7. The method of claim 1, wherein the user interface presents an integrated development environment (IDE), wherein the IDE comprises a source code editor pane and a debugging pane, wherein the first pinned area captures a portion of the source code editor pane such that code within a pinned portion of the source code editor pane remains fixed in response to movement of a scrollbar, and wherein errors displayed within the debugging pane move in response to the movement of the scrollbar.

8. The method of claim 1, wherein the first pinned area and the second pinned area are indexed to a same z-index above the unpinned area.

9. The method of claim 1, wherein the first pinned area is visually coded as a star in order to indicate that the content in the first pinned area is related to astronomy.

10. The method of claim 1, wherein the first pinned area is visually coded as a cloud in order to indicate that the content in the first pinned area is related to meteorology.

11. A method of pinning an area on a user interface, wherein the method comprises:
    receiving, by one or more processors, a pinning signal from a user, wherein the pinning signal defines a pinned area on a user interface, and wherein the pinned area is a non-rectangular unrestricted freeform area that is defined by the user; and
    receiving, by one or more processors, a scrolling input, wherein the scrolling input causes an unpinned area on the user interface to move on the user interface, wherein the scrolling causes the pinned area to be z-indexed above the unpinned area that has moved, wherein the scrolling causes the pinned area to remain in a fixed position on the user interface, wherein the user interface presents a spreadsheet, wherein the pinned area extends across only partial portions of different cells from at least two columns in the spreadsheet, wherein the different cells contain different strings of data, and wherein only a portion of the different strings of data are pinned by the pinned area that extended across only partial portions of the different cells.

12. A method of pinning an area on a user interface, wherein the method comprises:
    receiving, by one or more processors, a pinning signal from a user, wherein the pinning signal defines a pinned area on a user interface, and wherein the pinned area is a non-rectangular unrestricted freeform area that is defined by the user; and
    receiving, by one or more processors, a scrolling input, wherein the scrolling input causes an unpinned area on the user interface to move on the user interface, wherein the scrolling causes the pinned area to be z-indexed above the unpinned area that has moved, wherein the scrolling causes the pinned area to remain in a fixed position on the user interface, wherein the user interface presents a spreadsheet, wherein the pinned area extends across only partial portions of different cells from at least two rows in the spreadsheet, wherein the different cells contain different strings of data, and wherein only a portion of the different strings of data are pinned by the pinned area that extended across only partial portions of the different cells.

* * * * *